United States Patent
Furukawa et al.

(10) Patent No.: US 9,953,641 B2
(45) Date of Patent: Apr. 24, 2018

(54) SPEECH COLLECTOR IN CAR CABIN

(71) Applicant: Panasonic Intellectual Property Management Co., Ltd., Osaka (JP)

(72) Inventors: Hiroki Furukawa, Osaka (JP); Takeo Kanamori, Osaka (JP); Shinichi Yuzuriha, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/298,300

(22) Filed: Oct. 20, 2016

(65) Prior Publication Data

US 2017/0116983 A1    Apr. 27, 2017

(30) Foreign Application Priority Data

Oct. 27, 2015 (JP) .................................. 2015-210555

(51) Int. Cl.
*G10L 15/00* (2013.01)
*G10L 15/20* (2006.01)
(Continued)

(52) U.S. Cl.
CPC .............. *G10L 15/20* (2013.01); *G10L 15/22* (2013.01); *G10L 21/0216* (2013.01);
(Continued)

(58) Field of Classification Search
CPC ....... G10L 2021/02165; G10L 21/0208; G10L 2021/02166
(Continued)

(56) References Cited

U.S. PATENT DOCUMENTS 3,745,517 A * 7/1973 Sochard .................. F42C 13/06
367/107
3,992,584 A * 11/1976 Dugan ..................... H03G 1/02
381/107
(Continued)

FOREIGN PATENT DOCUMENTS

| JP | 2003-114699 | 4/2003 |
| WO | 2012/165657 | 12/2012 |
| WO | 2014/125669 | 8/2014 |

OTHER PUBLICATIONS

The Extended European Search Report from the European Patent Office (EPO) dated Jan. 4, 2017 for the related European Patent Application No. 16195396.3.

*Primary Examiner* — Michael Colucci
(74) *Attorney, Agent, or Firm* — Greenblum & Bernstein, P.L.C.

(57) ABSTRACT

An apparatus includes a first microphone disposed near a first seat in a car cabin, the first seat configured to seat a first occupant, a second microphone disposed near a second seat in the car cabin, the second seat configured to seat a second occupant, a processor, and a memory storing a computer program. The computer program, when executed, causes the processor to execute operations including: estimating a first mixed speech using a second signal acquired by the second microphone, the first mixed speech including a first speech that has been uttered by the second occupant and has entered the first microphone, and removing the first mixed speech from a first signal acquired by the first microphone.

20 Claims, 10 Drawing Sheets

(51) Int. Cl.
  *G10L 15/22* (2006.01)
  *G10L 21/0232* (2013.01)
  *G10L 25/87* (2013.01)
  G10L 21/0208 (2013.01)
  G10L 21/0216 (2013.01)
  G10L 25/78 (2013.01)
  B60R 16/037 (2006.01)

(52) U.S. Cl.
  CPC .......... *G10L 21/0232* (2013.01); *G10L 25/87* (2013.01); *B60R 16/0373* (2013.01); *G10L 2021/02087* (2013.01); *G10L 2021/02165* (2013.01); *G10L 2021/02166* (2013.01); *G10L 2025/783* (2013.01)

(58) Field of Classification Search
  USPC .............. 704/9, 226; 348/345; 381/71.1
  See application file for complete search history.

(56) References Cited

U.S. PATENT DOCUMENTS

| | | | | |
|---|---|---|---|---|
| 4,090,032 A * | 5/1978 | Schrader | ................ | H04R 3/005 381/108 |
| 5,475,731 A * | 12/1995 | Rasmusson | ........... | H04M 9/082 379/3 |
| 6,505,057 B1 | 1/2003 | Finn et al. | | |
| 7,117,145 B1 * | 10/2006 | Venkatesh | ........... | G10L 21/0208 704/200 |
| 8,831,942 B1 * | 9/2014 | Nucci | ..................... | G10L 25/90 704/207 |
| 9,071,892 B2 * | 6/2015 | Gratke | ..................... | H04R 3/00 |
| 9,431,013 B2 * | 8/2016 | Reuter | ..................... | G10L 15/20 |
| 2002/0071573 A1 | 6/2002 | Finn | | |
| 2009/0312660 A1 * | 12/2009 | Guarino | .................... | A61B 5/08 600/529 |
| 2010/0036659 A1 * | 2/2010 | Haulick | ................ | G10L 19/012 704/226 |
| 2012/0070013 A1 * | 3/2012 | Vau | ..................... | G10K 11/178 381/71.4 |
| 2013/0282373 A1 * | 10/2013 | Visser | ................ | G10L 21/0208 704/233 |
| 2014/0142928 A1 * | 5/2014 | Campbell | ............ | G10H 1/0091 704/201 |
| 2015/0156395 A1 * | 6/2015 | Bao | ........................ | H04N 5/232 348/345 |
| 2015/0245129 A1 * | 8/2015 | Dusan | .................. | H04R 1/1083 381/71.6 |
| 2015/0264480 A1 * | 9/2015 | Talwar | ................... | H04R 3/005 381/71.4 |
| 2015/0380011 A1 | 12/2015 | Tsujikawa et al. | | |
| 2016/0111109 A1 * | 4/2016 | Tsujikawa | .............. | H04R 3/005 704/226 |

* cited by examiner

SPEECH COLLECTOR IN CAR CABIN

BACKGROUND

1. Technical Field

The present disclosure relates to a speech collector and speech collection method in a car cabin.

2. Description of the Related Art

Figure 10:
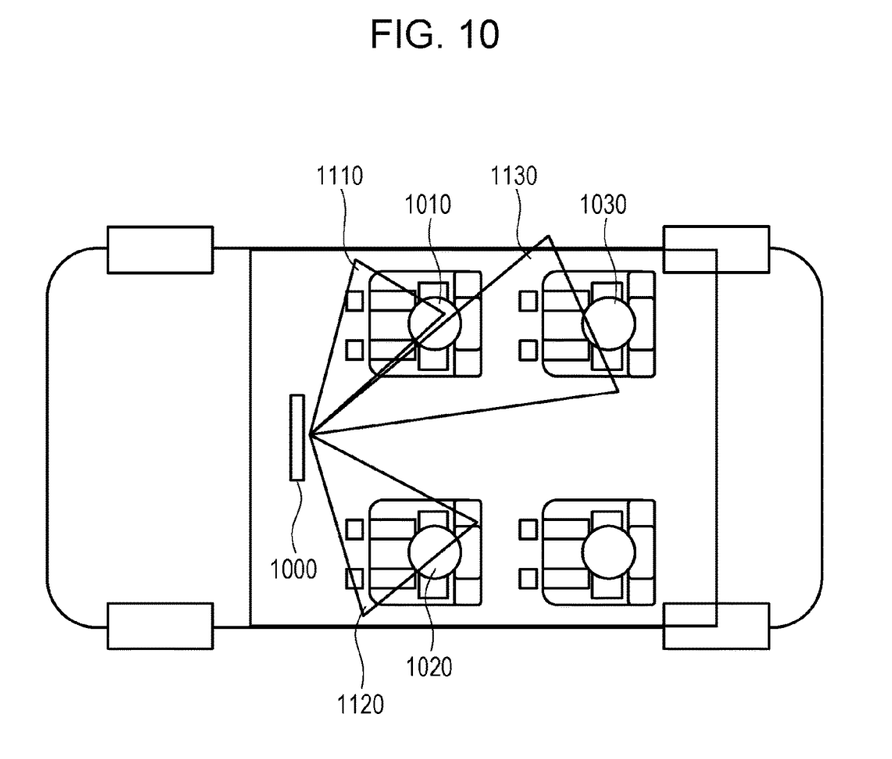
FIG. 10 is a diagram showing related art.

Japanese Unexamined Patent Application Publication No. 2003-114699 discloses detecting the directions of speakers while continuously changing directional characteristics of a microphone array, dividing speech data acquired by the microphone array into pieces of speech data corresponding to the directions of the speakers by signal processing, and recognizing speeches from the pieces of speech data (paragraphs [0027], [0028]). Thus, when speakers 1010, 1020, and 1030 are seated on a driver's seat, a passenger seat, and the like as shown in FIG. 10, Japanese Unexamined Patent Application Publication No. 2003-114699 can acquire speech data while easily changing directional characteristics ranges 1110, 1120, and 1130 of a microphone array 1000 and can easily recognize the speeches of the speakers 1010, 1020, and 1030 on the basis of the speech data (paragraph [0044], FIG. 8).

SUMMARY

However, the related art disclosed in Japanese Unexamined Patent Application Publication No. 2003-114699 has room for further improvement.

One non-limiting and exemplary embodiment provides a car-mounted speech collector and the like that when multiple speakers utter speeches simultaneously in a car cabin, prevent mixing into the speech of a particular speaker which is desired to be collected, of the speech of another speaker.

In one general aspect, the techniques disclosed here feature an apparatus including a first microphone disposed near a first seat on which a first occupant is seated in a car cabin, a second microphone disposed near a second seat on which a second occupant is seated in the car cabin, a mixed speech estimation unit that estimates a mixed speech on the basis of a second signal acquired by the second microphone, the mixed speech being a speech that has been uttered by the second occupant and has entered the first microphone, and a noise remover that removes the mixed speech from a first signal acquired by the first microphone.

It should be noted that general or specific embodiments may be implemented as a system, a method, an integrated circuit, a computer program, a storage medium, or any selective combination thereof.

According to the present disclosure, when multiple occupants utter speeches simultaneously in a car cabin, it is possible to extract only the speech of a particular speaker which is desired to be collected and to improve the rate at which the speech of the particular speaker is recognized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

There has been commercialized a technology that collects a speech uttered by an occupant using a speech input device in a car cabin, recognizes a control command on the basis of the speech collected, and controls a corresponding device. The speech input device is typically a microphone mounted on a console called an overhead console, which is located on the ceiling and between the driver's seat and passenger seat. Thus, the occupant can input a speech in a hands-free manner. On the other hand, the microphone on the overhead console is several tens of centimeters away from the mouse of the speaker. For this reason, not only the speech of the speaker but also noise in the car cabin is more likely to enter the microphone. This results in problems such as the degradation of the speech collected by the microphone and a reduction in speech recognition rate.

One conceivable solution to these problems is the use of a directional microphone.

However, the directional microphone has some directional angle in its collection range and also has sensitivity to a direction other than the directivity direction, which is called a side lobe. For this reason, it has difficult in collecting only the speech of the target speaker. Further, the space in the car cabin is narrow, and many glass windows, which easily reflect sound, are disposed on the front, side, and rear of the car cabin. The front and side windows are near the occupants. For this reason, the speech of a speaker other than a particular speaker is reflected by the glass windows, and speeches from various directions reach the directional microphone. Consequently, when the multiple speakers utter speeches simultaneously, the directional microphone would collect the speech of the speaker other than the particular speaker even if the directivity of the directional microphone is directed toward the particular speaker, whose speech is desired to be collected. Thus, a conventional speech recognition device, which is assumed to recognize the speech of a single speaker, recognizes the speech of the particular speaker at a reduced rate.

Japanese Unexamined Patent Application Publication No. 2003-114699 described above identifies the direction of a speaker while changing the direction of the directivity of the microphone array.

However, as described above, the speech of the speaker flies about in various directions in the car cabin, and speeches from various directions enter the microphone array. For this reason, Japanese Unexamined Patent Application Publication No. 2003-114699 may determine that there are also speakers in directions other than the direction of that speaker, which is actually present in the car cabin. Accordingly, it cannot accurately extract the speech of the particular speaker in the car cabin.

The present disclosure aims to solve these problems and provides a car-mounted speech collector and the like that can accurately extract the speech of a particular speaker in a car cabin.

A car-mounted speech collector of one aspect of the present disclosure includes a first microphone disposed near a first seat on which a first occupant is seated in a car cabin, a second microphone disposed near a second seat on which a second occupant is seated in the car cabin, a mixed speech estimation unit that estimates a mixed speech on the basis of a second signal acquired by the second microphone, the mixed speech being a speech that has been uttered by the second occupant and has entered the first microphone, and a noise remover that removes the mixed speech from a first signal acquired by the first microphone.

According to this configuration, the mixed speech, which is a speech that has been uttered by the second occupant and has entered the first microphone, is estimated on the basis of the second signal acquired by the second microphone and then removed from the first signal acquired by the first microphone.

Thus, when multiple occupants utter speeches simultaneously in a car cabin, it is possible to extract only the speech of a particular speaker which is desired to be collected and to improve the rate at which the speech of the particular speaker is recognized. Also, even when a hands-free speech is uttered, it is possible to eliminate interference caused by a speech uttered by another occupant and to obtain a high recognition rate.

In the above aspect, the car-mounted speech collector may further include a first switch disposed near the first seat and a second switch disposed near the second seat. (1) When the first switch is pressed, the mixed speech estimation unit may estimate a first mixed speech on the basis of the second signal, the first mixed speech being a speech that has been uttered by the second occupant and has entered the first microphone, and the noise remover may remove the first mixed speech from the first signal. (2) When the second switch is pressed, the mixed speech estimation unit may estimate a second mixed speech on the basis of the first signal, the second mixed speech being a speech that has been uttered by the first occupant and has entered the second microphone, and the noise remover may remove the second mixed speech from the second signal.

According to this configuration, the car-mounted speech collector includes the first and second switches and therefore can accurately determine which of the first and second occupants is the particular speaker.

In the above aspect, the car-mounted speech collector may further include a speech determination unit that determines whether any of the first and second signals includes a speech section. (1) If the speech determination unit determines that the first signal includes a speech section, the mixed speech estimation unit may estimate a first mixed speech using the second signal, the first mixed speech being a speech that has been uttered by the second occupant and has entered the first microphone, and the noise remover may remove the first mixed speech from the first signal. (2) If the speech determination unit determines that the second signal includes a speech section, the mixed speech estimation unit may estimate a second mixed speech using the first signal, the second mixed speech being a speech that has been uttered by the first occupant and has entered the second microphone, and the noise remover may remove the second mixed speech from the second signal.

According to this configuration, if the first signal includes a speech section, the speech of the first occupant is extracted; if the second signal includes a speech section, the speech of the second occupant is extracted. Thus, it can be automatically determined which of the first and second occupants is the particular speaker.

In the above aspect, the first and second signals may be previously assigned priorities. (3) If the speech determination unit determines that both the first and second signals include speech sections and if the priority of the first signal is higher than the priority of the second signal, the mixed speech estimation unit may estimate the first mixed speech, and the noise remover may remove the first mixed speech from the first signal. (4) If the speech determination unit determines that both the first and second signals include speech sections and if the priority of the second signal is higher than the priority of the first signal, the mixed speech estimation unit may estimate the second mixed speech, and the noise remover may remove the second mixed speech from the second signal.

According to this configuration, if both the first and second signals include speech sections and if the priority of the first signal is higher than the priority of the second signal, the speech of the first occupant is extracted; if both the first and second signals include speech sections and if the priority of the second signal is higher than the priority of the first signal, the speech of the second occupant is extracted. Thus, when the first and second occupants utter speeches simultaneously, it is possible to prevent a failure to determine which of the first and second occupants is the particular speaker.

In the above aspect, the first and second microphones may be unidirectional microphones.

According to this configuration, the speech of the particular speaker can be accurately extracted.

In the above aspect, the first and second microphones may be array microphones each consisting of multiple microphone units.

According to this configuration, the speech of the particular speaker can be accurately extracted.

In the above aspect, the mixed speech estimation unit may estimate the mixed speech using the adaptive filter whose filter coefficient has been corrected so that an output signal from the noise remover becomes uncorrelated with or independent of an input signal.

According to this configuration, the mixed speech is estimated using the adaptive filter. Thus, the mixed speech can be accurately obtained. Also, the accuracy of the estimation of the mixed speech can be increased as the adaptive filter is used.

In the above aspect, the speech determination unit may calculate envelopes of the first and second signals, detect bottom levels of the envelopes calculated, set a threshold on the basis of the bottom levels detected, and determine a section in which levels of the first and second signals are higher than the threshold set, as the speech section.

According to this configuration, the threshold is set on the basis of the bottom levels of the envelopes. Thus, an appropriate threshold corresponding to the scene can be set compared to when the threshold is fixed.

First Embodiment

Figure 1:
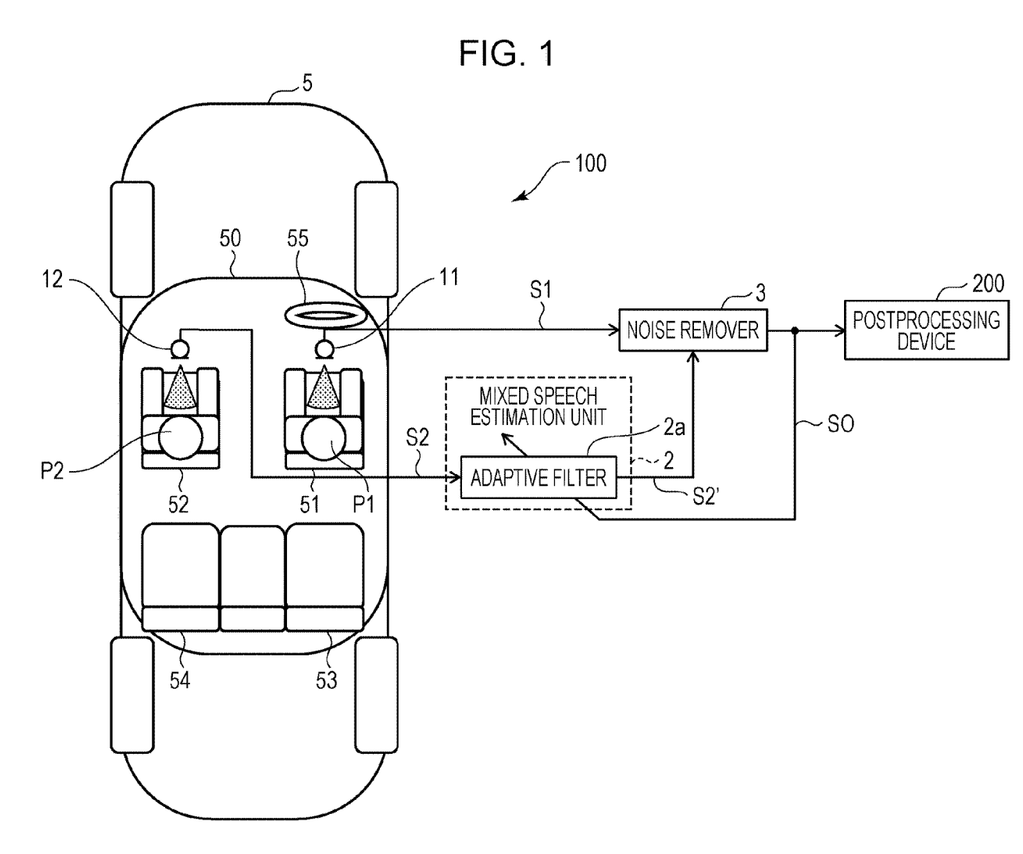
FIG. 1 is a diagram showing an example of the overall configuration of a speech collection system to which a car-mounted speech collector of a first embodiment of the present disclosure is applied.

FIG. 1 is a diagram showing an example of the overall configuration of a speech collection system to which a car-mounted speech collector 100 of a first embodiment of the present disclosure is applied. The speech collection system includes the car-mounted speech collector 100 and a postprocessing device 200.

The car-mounted speech collector 100 includes microphones 11 and 12, a mixed speech estimation unit 2, and a noise remover 3. The microphone 11 (an example of a first microphone) is disposed near a seat 51 (an example of a first seat) on which an occupant P1 (an example of a first occupant) is seated in a car cabin 50 and mainly collects the speech of the occupant P1. The microphone 12 (an example of a second microphone) is disposed near a seat 52 (an example of a second seat) on which an occupant P2 (an example of a second occupant) is seated in the car cabin 50 and mainly collects the speech of the occupant P2.

In the example shown in FIG. 1, the microphone 11 is disposed above the occupant P1 and near the ceiling of the car cabin 50, and the microphone 12 is disposed above the occupant P2 and near the ceiling of the car cabin 50. For example, the microphone 11 is mounted on a sun visor for the occupant P1 on the ceiling, and the microphone 12 is mounted on a sun visor for the occupant P2 on the ceiling. The microphone 11 may be mounted on a dashboard in front of the occupant P1, and the microphone 12 may be mounted on a dashboard in front of the occupant P2. The microphones 11 and 12 may also be mounted on a center console between the seats 51 and 52 or on an overhead console disposed above the center console and on the ceiling. The microphones 11 and 12 may be disposed in any positions in the car cabin 50 as long as they can collect the speeches of the occupants P1 and P2.

The microphones 11 and 12 are unidirectional microphones or array microphones. If the microphones 11 and 12 are unidirectional microphones, the microphones are disposed, for example, in such a manner that the directivities thereof are directed toward the heads of the occupants P1 and P2, respectively. An array microphone is a microphone in which multiple microphones are arranged close to each other in an array and whose directivity can be directed in any direction by signal processing. If the microphones 11 and 12 are array microphones, the microphones previously detect the directions of the occupants P1 and P2, and the directions of directivities thereof are determined so as to be directed in the directions detected. This process is performed by, for example, a processor or CPU (not shown).

The mixed speech estimation unit 2 estimates a mixed speech signal S2' that has been generated by the occupant P2 and has entered the microphone 11, on the basis of a signal S2 (an example of a second signal) acquired by the microphone 12.

The mixed speech estimation unit 2 includes an adaptive filter 2a and estimates the mixed speech signal S2' using the adaptive filter 2a. Specifically, the mixed speech estimation unit 2 corrects the filter coefficient of the adaptive filter 2a using a predetermined adaptive algorithm so that a signal SO (an example of an output signal) outputted from the noise remover 3 becomes uncorrelated with or independent of the input of the adaptive filter 2a. As will be described later, the signal SO is a signal obtained by subtracting the mixed speech signal S2' from a signal S1 (an example of a first signal) acquired by the microphone 11. By correcting the filter coefficient of the adaptive filter 2a so that the signal SO becomes uncorrelated with or independent of the input of the adaptive filter 2a, the mixed speech signal S2', which has been generated by the occupant P2 and mixed into a speech uttered by the occupant P1 and which is contained in the signal S1, is outputted from the adaptive filter 2a.

The mixed speech estimation unit 2 may perform this filter coefficient correction process periodically or each time the microphone 12 acquires a signal having a predetermined level or higher. The predetermined adaptive algorithm may be the least-mean-square (LMS) algorithm or independent component analysis (ICA) algorithm. The adaptive filter may be an LMS filter.

The noise remover 3 generates the signal SO by subtracting the mixed speech signal S2' from the signal S1. The mixed speech signal S2' is a speech which has been uttered by the occupant P2 and which is contained in the signal S1. Accordingly, when the occupants P1 and P2 utter speeches simultaneously, the signal SO indicates the speech uttered by the occupant P1, which is the particular speaker.

In FIG. 1, the mixed speech estimation unit 2 and noise remover 3 may be a processor such as a DSP, or may be implemented by the execution of a control program stored in ROM by a CPU. This also applies to later embodiments.

The postprocessing device 200 is, for example, a speech recognition device and recognizes a speech using the signal SO. The speech recognition device recognizes the speech using, for example, a known speech recognition method. Since the signal SO indicates the speech uttered by the occupant P1 in the example shown in FIG. 1, the speech recognition device recognizes the speech uttered by the occupant P1.

Examples of speeches which can be recognized include control commands for controlling devices included in a vehicle 5. Examples of the devices included in the vehicle 5 include an air conditioner, a navigation system, a cruse controller, a television, and lights. For example, if the speech recognition device recognizes a control command for controlling the temperature of the air conditioner, the temperature of the air conditioner is set to a temperature indicated by the control command recognized.

Instead of the speech recognition device, the postprocessing device 200 may be, for example, a hands-free device, which is a device used by an occupant to operate a mobile phone by speech. For example, the hands-free device transmits the signal SO to a mobile phone using a communication system such as Bluetooth®.

The vehicle 5 is, for example, a four-wheel car and includes the car cabin 50. In the example shown in FIG. 1, the vehicle 5 is a five-seater passenger car, but not limited thereto. It may be a two-, seven-, or other number-seater passenger car, or may be a bus or truck rather than a passenger car.

The car cabin 50 includes seats 51 to 54. The seat 51 is a driver's seat which is disposed behind a steering wheel 55 and on which the occupant P1 as a driver is seated.

The seat 52 is a passenger seat which is disposed on the left side of the seat 51 in a top view and on which the occupant P2 is seated. The seats 53 and 54 are rear seats disposed behind the seats 51 and 52, respectively.

Figure 2:
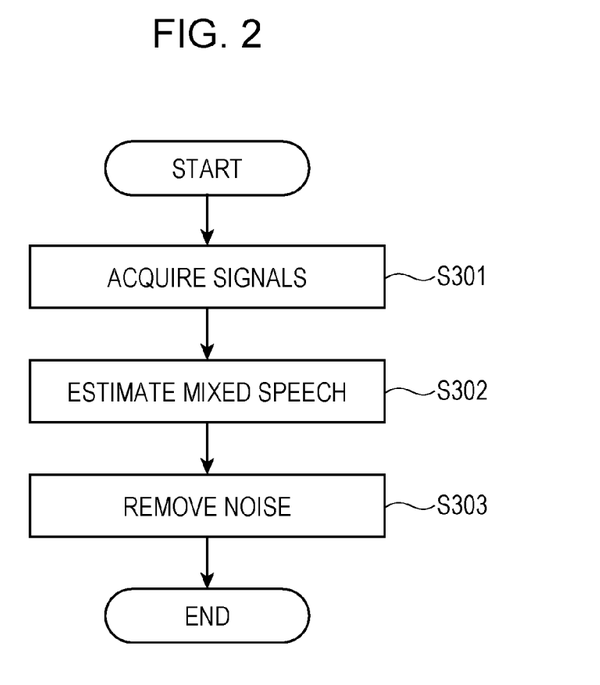
FIG. 2 is a flowchart showing an example of a process performed by the car-mounted speech collector of the first embodiment of the present disclosure.

FIG. 2 is a flowchart showing an example of a process performed by the car-mounted speech collector 100 of the first embodiment of the present disclosure. The process shown in FIG. 2 may be performed at predetermined time intervals or may be performed when the microphones 11 and 12 collect speeches having a predetermined level or higher. This also applies to processes shown by flowcharts in FIGS. 6 and 9 (to be discussed later). First, the microphones 11 and 12 acquire signals S1 and S2, respectively (S301).

Then, the mixed speech estimation unit 2 estimates a mixed speech signal S2' indicating a speech uttered by the occupant P2 and contained in the signal S1, by filtering the signal S2 using the adaptive filter 2a (S302).

Then, the noise remover 3 generates a signal SO by subtracting the mixed speech signal S2' from the signal S1.

As seen above, according to the present embodiment, when multiple occupants utter speeches simultaneously in a car cabin, it is possible to extract only the speech of a particular speaker which is desired to be collected and to improve the rate at which the speech of the particular speaker is recognized.

While the occupant P1 is the particular speaker in the above description, the occupant P2 may be the particular speaker. In this case, it is only necessary to connect the mixed speech estimation unit 2 between the microphone 11 and noise remover 3 and to connect the microphone 12 to the noise remover 3.

Second Embodiment

Figure 3:
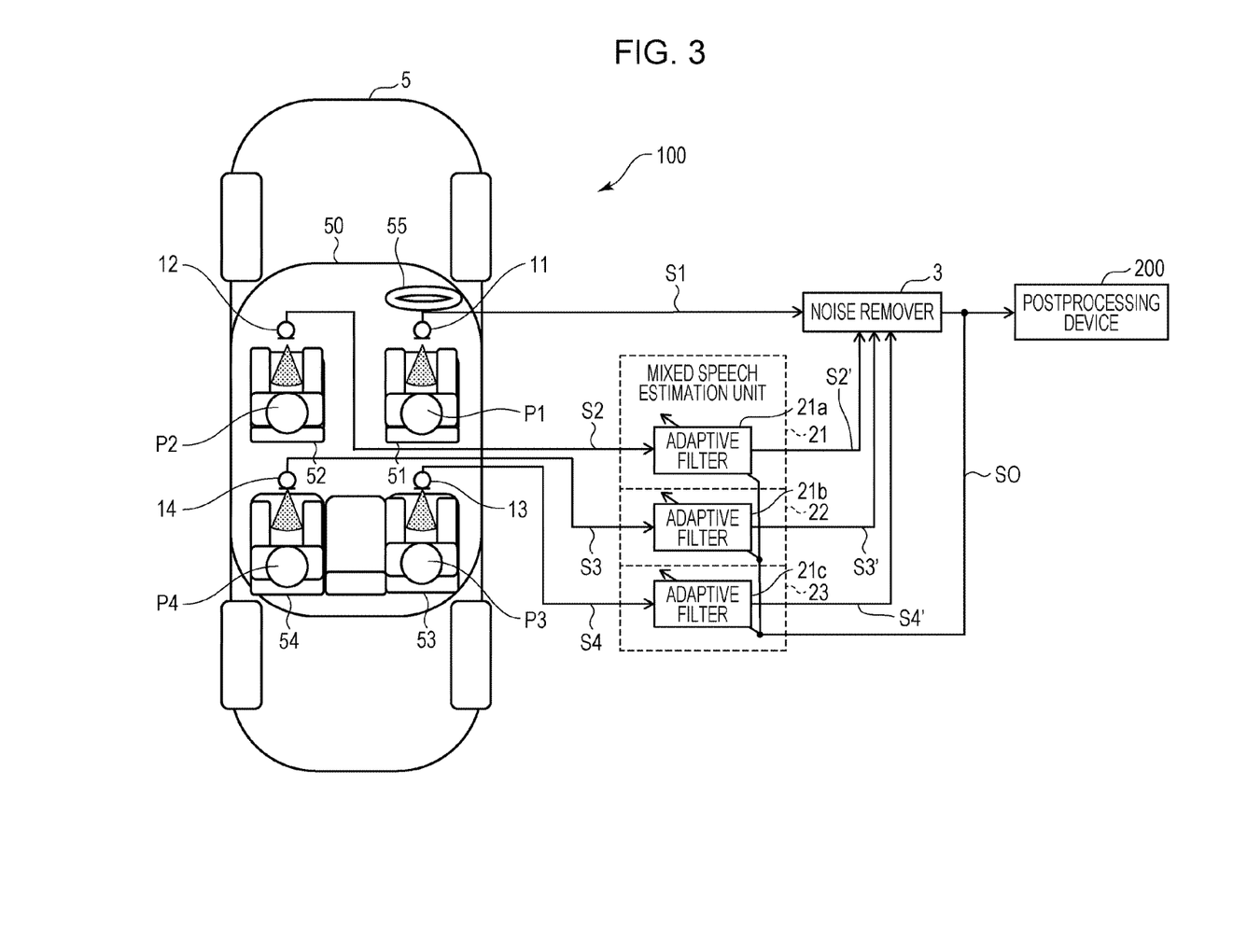
FIG. 3 is a diagram showing an example of the overall configuration of a speech collection system to which a car-mounted speech collector of a second embodiment of the present disclosure is applied.

A second embodiment is characterized in that microphones are disposed near front seats, as well as near rear seats. In the present embodiment, the same elements as those in the first embodiment are given the same reference signs and will not be described. FIG. 3 is a diagram showing an example of the overall configuration of a speech collection system to which a car-mounted speech collector 100 of a second embodiment of the present disclosure is applied.

FIG. 3 differs to FIG. 1 in that microphones 13 and 14 are disposed near seats 53 and 54 as rear seats and that three mixed speech estimation units, 21, 22, and 23, are disposed so as to correspond to microphones 12, 13, and 14.

While an occupant P1 is a particular speaker in the example shown in FIG. 3, one of occupants P2, P3, and P4 may be the particular speaker.

The microphone 13 is disposed, for example, above the seat 53 and near the ceiling and mainly collects the speech of the occupant P3. The microphone 14 is disposed, for example, above the seat 54 and near the ceiling and mainly collects the speech of the occupant P4. As in the first embodiment, the microphones 13 and 14 may be unidirectional microphones or array microphones. The directivities of the microphones 13 and 14 are directed toward the occupants P3 and P4, respectively.

Hereafter, a signal acquired by the microphone 13 will be referred to as a signal S3, and a signal acquired by the microphone 14 as a signal S4.

The mixed speech estimation units 21, 22, and 23 include adaptive filters 21a, 21b, and 21c, respectively. Using a signal S2, the mixed speech estimation unit 21 estimates a mixed speech signal S2' indicating a speech which has been uttered by the occupant P2 and has entered the microphone 11. Specifically, as in the first embodiment, the mixed speech estimation unit 21 corrects the filter coefficient of the adaptive filter 21a using a predetermined adaptive algorithm so that a signal SO becomes uncorrelated with or independent of the input of the adaptive filter 2a and estimates the mixed speech signal S2' by filtering the signal S2 using the adaptive filter 21a thus corrected. Since the mixed speech signal S2' is a signal estimated using the signal S2, it mainly indicates the speech of the occupant P2 mixed into the signal S1.

As with the mixed speech estimation unit 21, the mixed speech estimation units 22 and 23 estimate mixed speech signals S3' and S4' using the signals S3 and S4, respectively. Since the mixed speech signals S3' and S4' are signals estimated using the signals S3 and S4, respectively, they mainly indicate the speeches of the occupants P3 and P4, respectively, mixed into the signal S1.

The noise remover 3 generates the signal SO by subtracting the mixed speech signals S2', S3', and S4' from the signal S1. In this way, the signals other than the speech uttered by the occupant P1, which is the particular speaker, are removed as noise from the signal S1, and the resulting signal is obtained as the signal SO.

As seen above, according to the third embodiment, even when the microphones 13 and 14 are disposed near the rear seats 53 and 54, respectively, only the speech of the particular speaker can be extracted.

If an occupant other than the occupant P1, that is, one of the occupants P2, P3, and P4 is the particular speaker in FIG. 3, it is only necessary to connect the mixed speech estimation units 21, 22, and 23 to the three microphones corresponding to the occupants other than the one occupant.

Figure 4:
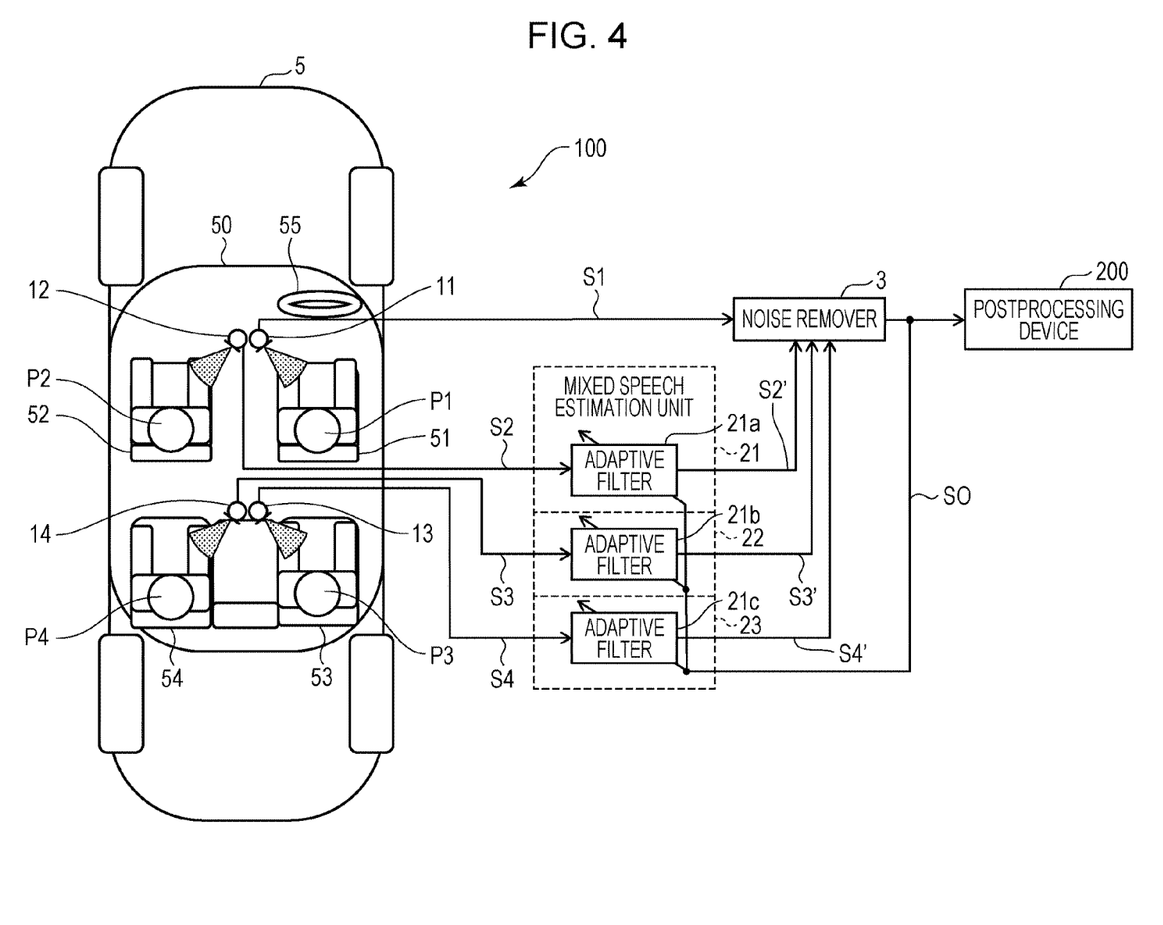
FIG. 4 is a diagram showing a modification of the car-mounted speech collector of the second embodiment of the present disclosure.

FIG. 4 is a diagram showing a modification of the car-mounted speech collector 100 of the second embodiment of the present disclosure. In FIG. 3, the microphones 11 to 14 are disposed in the horizontal centers of the corresponding seats in a top view. In FIG. 4, on the other hand, microphones 11 to 14 are disposed so as to sandwich a center line passing through the horizontal center of a car cabin 50 and be horizontally close to each other in a top view. If the aspect shown in FIG. 4 is used, the microphones 11 and 12 may be disposed on an overhead console for front seats on the ceiling of the car cabin 50, and the microphones 13 and 14 may be disposed on an overhead console for rear seats on the ceiling of the car cabin 50. Whichever of the aspects in FIGS. 3 and 4 is used, the directivities of the microphone 11 to 14 are set toward the heads of the corresponding occupants, P1 to P4.

Third Embodiment

Figure 5:
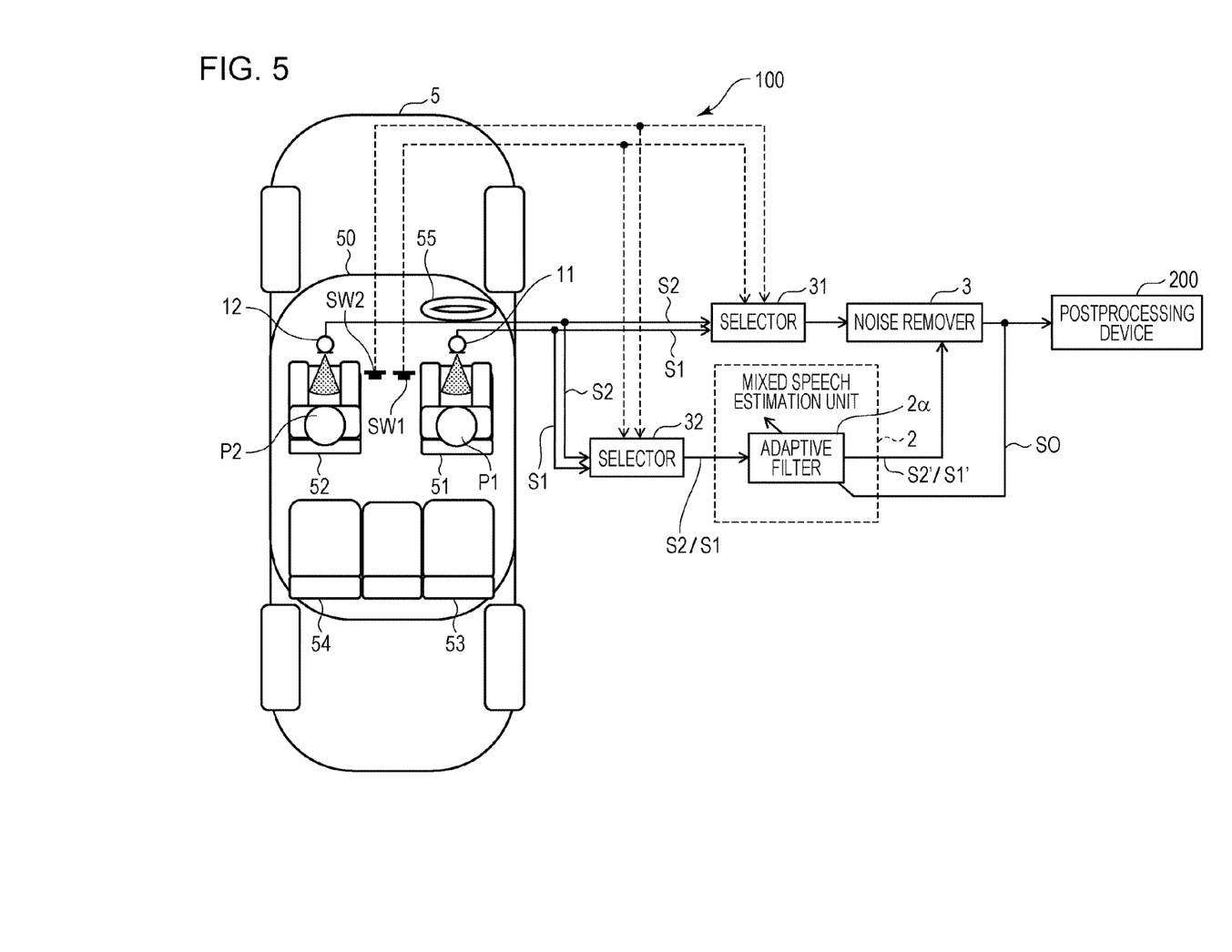
FIG. 5 is a diagram showing an example of the overall configuration of a speech collection system to which a car-mounted system of a third embodiment of the present disclosure is applied.

A car-mounted speech collector 100 of a third embodiment is characterized in that it includes switches for specifying a particular speaker. FIG. 5 is a diagram showing an example of the overall configuration of a car-mounted system to which the car-mounted speech collector 100 of the third embodiment of the present disclosure is applied. In the present embodiment, the same elements as those in the first embodiment are given the same reference signs and will not be described.

FIG. 5 differs from FIG. 1 in that the car-mounted speech collector 100 includes switches SW1 and SW2 and selectors 31 and 32. The switches SW1 and SW2 are, for example, push-button switches and are disposed near seats 51 and 52, respectively. In the example shown in FIG. 5, the switches SW1 and SW2 are disposed on an overhead console on the ceiling in a car cabin 50 so as to sandwich a center line passing through the horizontal center of the car cabin 50 and be horizontally close to each other in a top view. However, the switches SW1 and SW2 need not be disposed in such positions and may be disposed in any positions as long as occupants P1 and P2 can operate the switches SW1 and SW2, respectively. For example, the switches SW1 and SW2 may be disposed on a dashboard or center console, or on the back sides of the seats 51 and 52.

The switches SW1 and SW2 are configured to be recessible into the ceiling and, for example, are each turned on when recessed into the ceiling and turned off when becoming flush with the ceiling. The switches SW1 and SW2 are also configured to be exclusively turned on so that they are not turned on simultaneously. When the switch SW1 is turned on, the occupant P1 is set as a particular speaker; when the switch SW2 is turned on, the occupant P2 is set as a particular speaker. Hereafter, it is assumed that the switches SW1 and SW2 are not turned on simultaneously.

When the switch SW1 is on and the switch SW2 is off, the selector 31 selects a signal S1 and outputs it to a noise remover 3, and the selector 32 selects a signal S2 and outputs it to a mixed speech estimation unit 2. When the switch SW1 is off and the switch SW2 is on, the selector 31 selects the signal S2 and outputs it to the noise remover 3, and the selector 32 selects the signal S1 and outputs it to the mixed speech estimation unit 2.

The selectors 31 and 32 may be a DSP, or may be implemented by the execution of control program stored in ROM by a CPU. This also applies to a fourth embodiment.

When the mixed speech estimation unit 2 receives the signal S2, it estimates a mixed speech signal S2' (an example of a first mixed speech signal) using an adaptive filter $2\alpha$. The mixed speech signal S2' indicates a speech uttered by the occupant P2 and contained in the signal S1. At this time, as in the first embodiment, the mixed speech estimation unit 2 corrects the correction coefficient of the adaptive filter $2\alpha$ using a predetermined adaptive algorithm so that a signal SO becomes uncorrelated with or independent of the input of the adaptive filter $2\alpha$.

On the other hand, when the mixed speech estimation unit 2 receives the signal S1, it estimates a mixed speech signal S1' (an example of a second mixed speech signal) using the adaptive filter $2\alpha$. The mixed speech signal S1' indicates a speech uttered by the occupant P1 and contained in the signal S2. At this time, the mixed speech estimation unit 2 corrects the correction coefficient of the adaptive filter $2\alpha$ using a predetermined adaptive algorithm so that a signal SO becomes uncorrelated with or independent of the input of the adaptive filter $2\alpha$.

Figure 6:
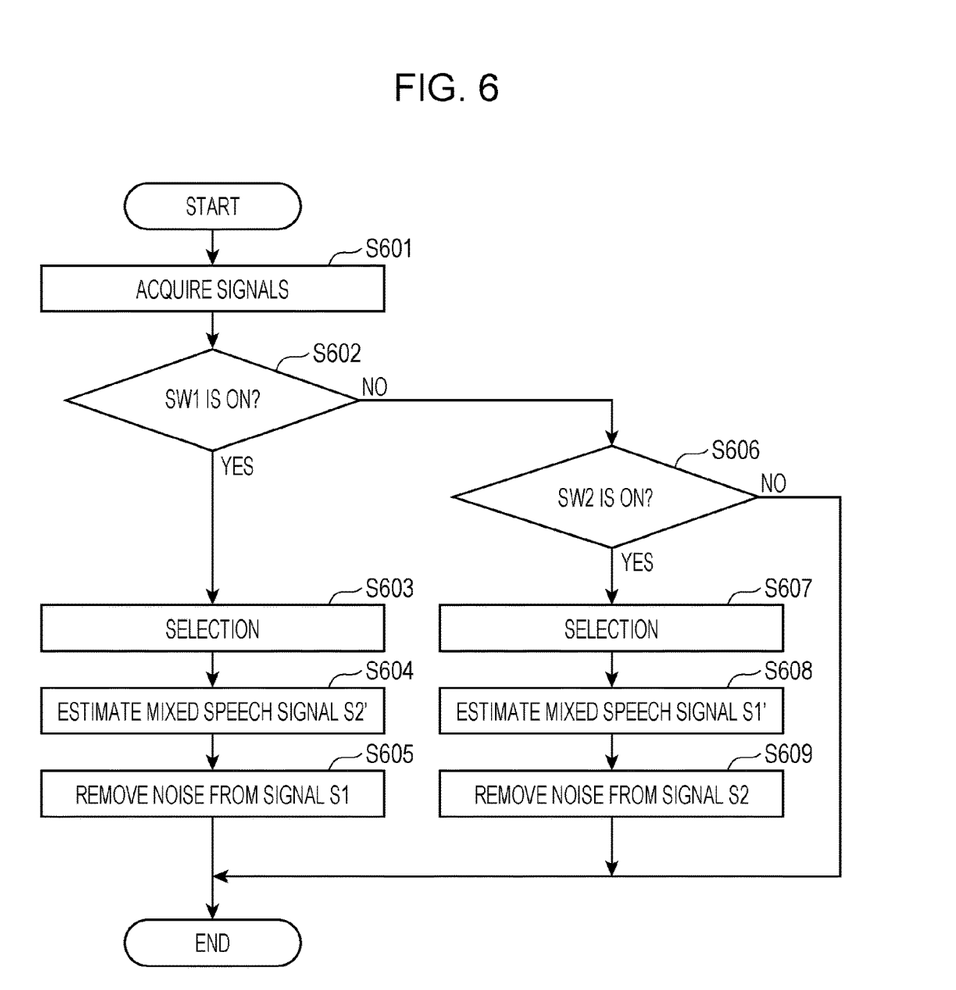
FIG. 6 is a flowchart showing an example of a process performed by the car-mounted speech collector of the third embodiment of the present disclosure.

FIG. 6 is a flowchart showing an example of a process performed by the car-mounted speech collector 100 of the third embodiment of the present disclosure. First, the microphones 11 and 12 acquire signals S1 and S2, respectively (S601).

If the switch SW1 is on (YES in S602), the selector 31 selects the signal S1 and outputs it to the noise remover 3, and the selector 32 selects the signal S2 and outputs it to the mixed speech estimation unit 2 (S603).

The mixed speech estimation unit 2 filters the signal S2 using the adaptive filter $2\alpha$, estimates a mixed speech signal S2', and outputs it to the noise remover 3 (S604).

The noise remover 3 generates a signal SO by subtracting the mixed speech signal S2' from the signal S1 (S605).

If the switch SW1 is off and the switch SW2 is on (NO in S602 and YES in S606), the selector 31 selects the signal S2 and outputs it to the noise remover 3, and the selector 32 selects the signal S1 and outputs it to the mixed speech estimation unit 2 (S607).

The mixed speech estimation unit 2 filters the signal S1 using the adaptive filter $2\alpha$, estimates a mixed speech signal S1', and outputs it to the noise remover 3 (S608).

The noise remover 3 generates a signal SO by subtracting the mixed speech signal S1' from the signal S2 (S609).

If the switch SW1 is off and the switch SW2 is off (NO in S602 and NO in S606), the process ends.

As seen above, in the present embodiment, the car-mounted speech collector 100 includes the switches SW1 and SW2 and thus can accurately determine which of the occupants P1 and P2 is the particular speaker.

While, in the flowchart shown in FIG. 6, the process ends if the switch SW1 is off and the switch SW2 is off (NO in S602 and NO in S606), the present disclosure may be configured otherwise. For example, if the switch is off and the switch SW2 is off, the selectors 31 and 32 may determine that the occupant P1 is the particular speaker and select the signals S1 and S2, respectively, or may determine that the occupant P2 is the particular speaker and select the signals S2 and S1, respectively. If the signals S1 and S2 are assigned priorities as described in a fourth embodiment (to be discussed later), the selectors 31 and 32 may determine that an occupant corresponding to the signal S1 or S2 having a higher priority is the particular speaker. The selectors 31 and 32 may also determine that an occupant corresponding to the signal S1 or S2 having a higher level is the particular speaker. Note that the priorities are previously assigned and stored in, for example, a storage device. The priorities may be changeable on the basis of an operation of any occupant.

While the two microphones, 11 and 12, are provided in the example shown in FIG. 5, the present disclosure may be configured otherwise. As shown in FIG. 3, microphones 13 and 14 may be provided.

Fourth Embodiment

Figure 7:
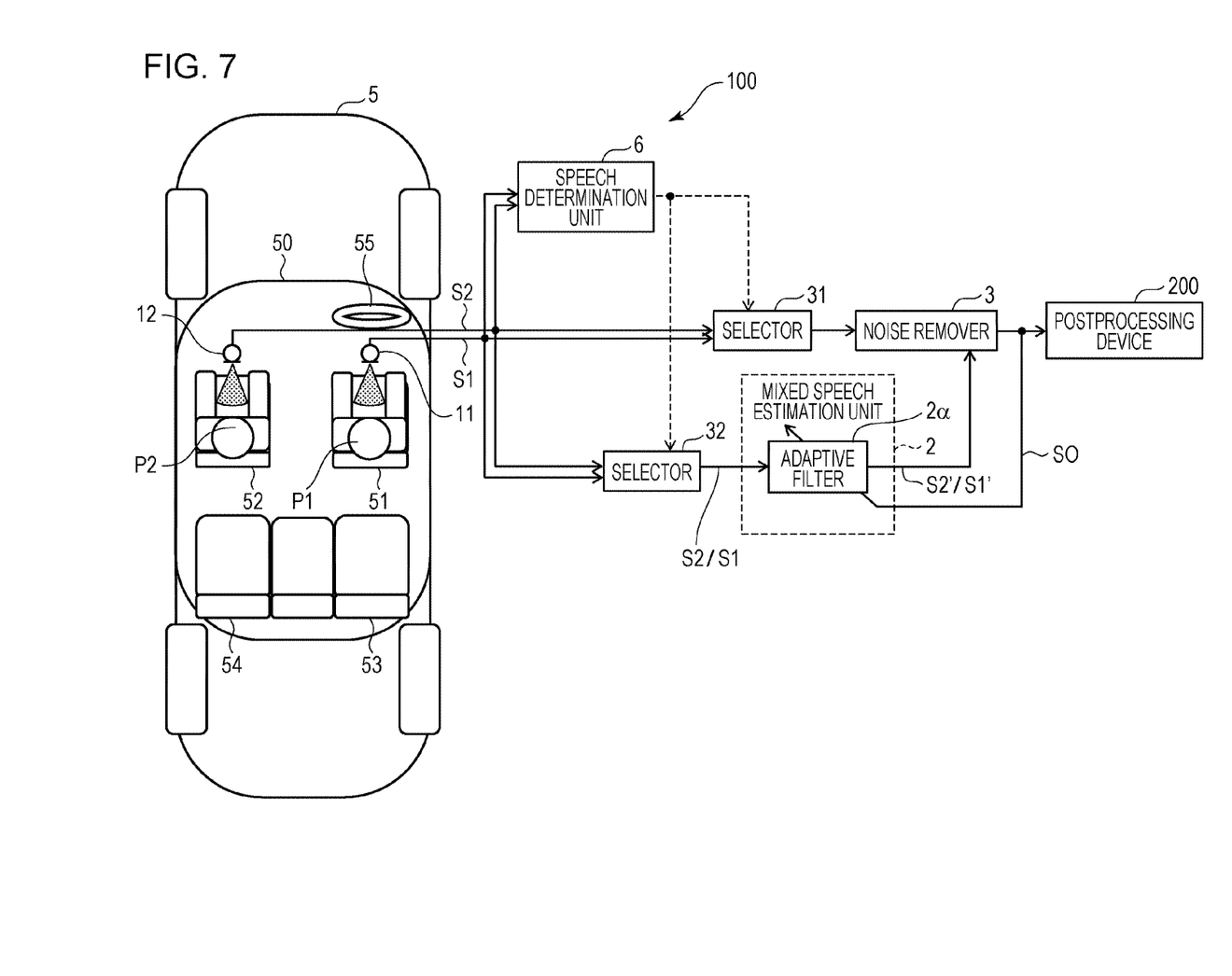
FIG. 7 is a diagram showing an example of the overall configuration of a speech collection system to which a car-mounted speech collector of a fourth embodiment of the present disclosure is applied.

A car-mounted speech collector 100 of a fourth embodiment is characterized in that it determines an occupant uttering a speech as a particular speaker. FIG. 7 is a diagram showing an example of the overall configuration of a speech collection system to which the car-mounted speech collector 100 of the fourth embodiment of the present disclosure is applied. In the present embodiment, the same elements as those in the first embodiment are given the same reference signs and will not be described.

Figure 8:
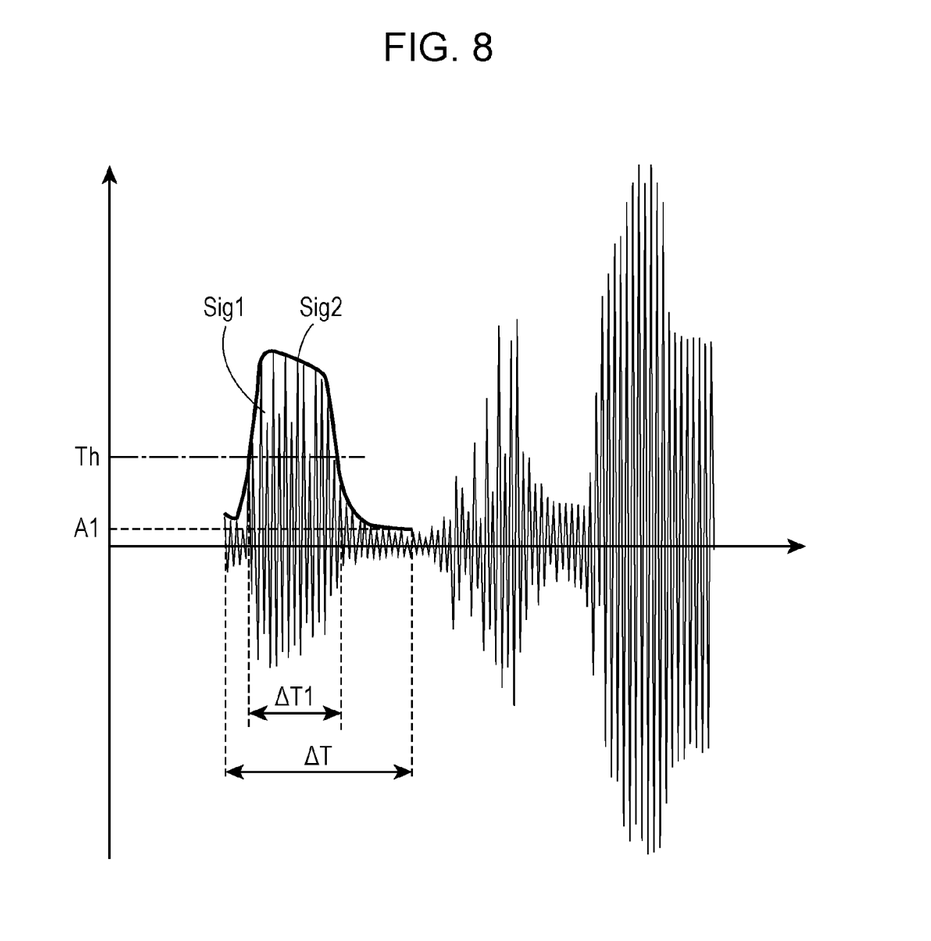
FIG. 8 is a diagram showing a process in which a speech determination unit detects a speech section.

FIG. 7 differs from FIG. 1 in that the car-mounted speech collector 100 includes a speech determination unit 6 and selectors 31 and 32. The speech determination unit 6 determines whether any of signals S1 and S2 includes a speech section. FIG. 8 is a diagram showing a process in which the speech determination unit 6 detects a speech section. The vertical axis of FIG. 8 represents the level of a signal (hereafter referred to as a "speech signal Sig1") acquired by microphones 11 and 12, and the horizontal axis thereof represents the time.

The speech signal Sig1 has a waveform in which the amplitude varies at high frequencies. The speech determination unit 6 sets a processing section $\Delta T$ in the speech signal Sig1. The processing section $\Delta T$ is set so as to be shifted at predetermined time intervals along the time axis. The speech determination unit 6 then obtains an envelope Sig2 of the speech signal Sig1 in the processing section T. While the envelope Sig2 is set over the speech signal Sig1 in FIG. 8, it may be set thereunder.

The speech determination unit 6 then detects the bottom level of the envelope Sig2. The speech determination unit 6 then sets, as a threshold Th, a value obtained by multiplying the bottom level A1 by a predetermined factor. At this time, the bottom level A1 is multiplied by a number greater than 1 (e.g., 2, 3).

The speech determination unit 6 then determines a section in which the level of the speech signal Sig1 is equal to or greater than the threshold Th, as a speech section ΔT1.

The speech determination unit 6 may be a DSP, or may be implemented by the execution of a control program stored in ROM by a CPU.

Referring back to FIG. 7, if the speech determination unit 6 determines that a signal S1 includes a speech section, the selector 31 selects the signal S1 and outputs it to a noise remover 3, and the selector 32 selects a signal S2 and outputs it to a mixed speech estimation unit 2.

If the speech determination unit 6 determines that the signal S2 includes a speech section, the selector 31 selects the signal S2 and outputs it to the noise remover 3, and the selector 32 selects the signal S1 and outputs it to the mixed speech estimation unit 2.

If the speech determination unit 6 determines that both the signals S1 and S2 include speech sections and if the signal S1 has a higher priority than the signal S2, the selector 31 selects the signal S1 and outputs it to the noise remover 3, and the selector 32 selects the signal S2 and outputs it to the mixed speech estimation unit 2.

If the speech determination unit 6 determines that both the signals S1 and S2 include speech sections and if the signal S2 has a higher priority than the signal S1, the selector 31 selects the signal S2 and outputs it to the noise remover 3, and the selector 32 selects the signal S1 and outputs it to the mixed speech estimation unit 2.

As in the third embodiment, the mixed speech estimation unit 2 includes an adaptive filter 2α. When the mixed speech estimation unit 2 receives the signal S2 selected by the selector 32, it estimates a mixed speech signal S2' (an example of a first mixed speech signal) using the adaptive filter 2α. When the mixed speech estimation unit 2 receives the signal S1 selected by the selector 32, it estimates a mixed speech signal S1' (an example of a second mixed speech signal) using the adaptive filter 2α.

Figure 9:
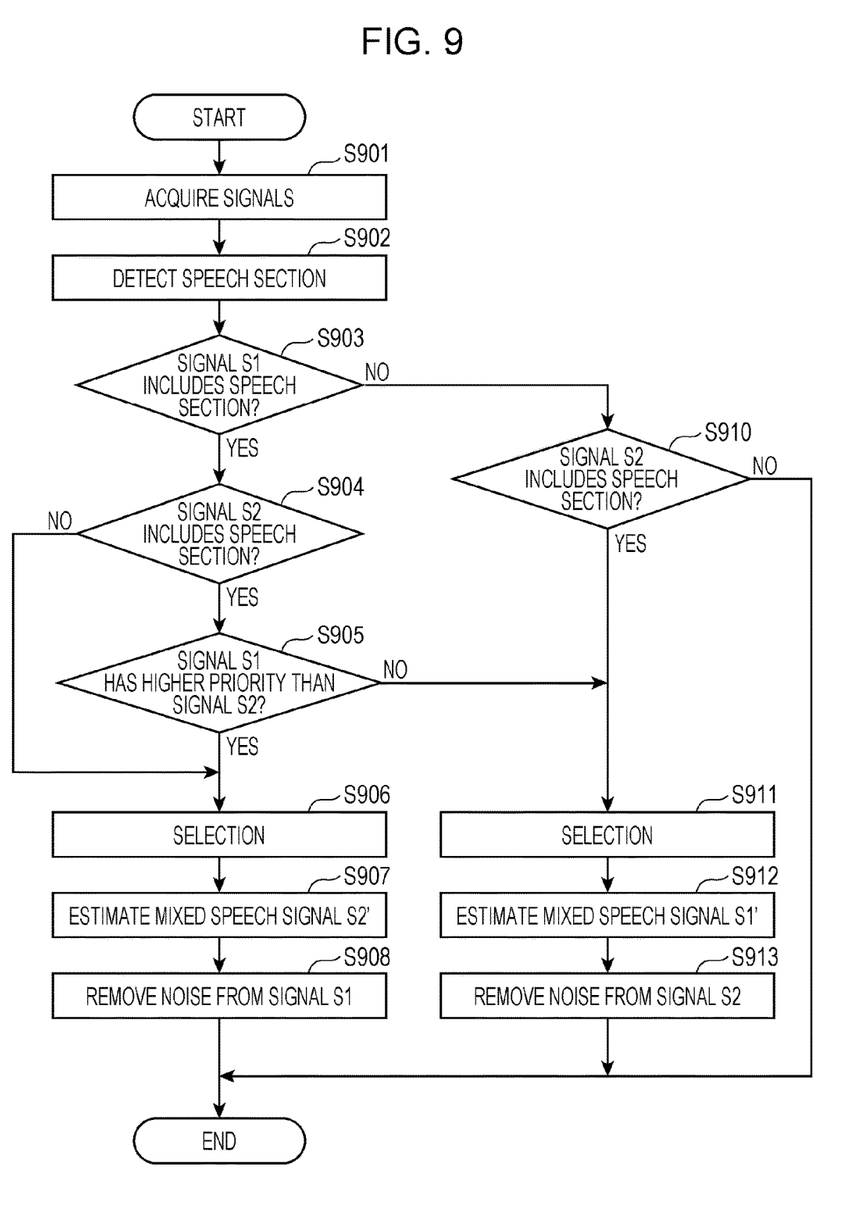
FIG. 9 is a flowchart showing an example of a process performed by the car-mounted speech collector of the fourth embodiment of the present disclosure.

FIG. 9 is a flowchart showing an example of a process performed by the car-mounted speech collector 100 of the fourth embodiment of the present disclosure. First, the microphones 11 and 12 acquire signals S1 and S2, respectively (S901). Then, the speech determination unit 6 detects speech sections in the signals S1 and S2 (S902).

If only the signal S1 includes a speech section (YES in S903 and NO in S904), the selector 31 selects the signal S1 and outputs it to the noise remover 3, and the selector 32 selects the signal S2 and outputs it to the mixed speech estimation unit 2 (S906).

Then, the mixed speech estimation unit 2 filters the signal S2 using the adaptive filter 2α, estimates a mixed speech signal S2', and outputs it to the noise remover 3 (S907).

Then, the noise remover 3 generates a signal SO by subtracting the mixed speech signal S2' from the signal S1 (S908).

If only the signal S2 includes a speech section (NO in S903 and YES in S910), the selector 31 selects the signal S2 and outputs it to the noise remover 3, and the selector 32 selects the signal S1 and outputs it to the mixed speech estimation unit 2 (S911).

Then, the mixed speech estimation unit 2 filters the signal S1 using the adaptive filter 2α, estimates a mixed speech signal S1', and outputs it to the noise remover 3 (S912).

Then, the noise remover 3 generates a signal SO by subtracting the mixed speech signal S1' from the signal S2 (S913).

If both the signals S1 and S2 include speech sections (YES in S903 and YES in S904) and if the signal S1 has a higher priority than the signal S2 (YES in S905), S906, S907, and S908 described above are performed.

On the other hand, if the signal S2 has a higher priority than the signal S1 (NO in S905), S911, S912, and S913 described above are performed.

If none of the signals S1 and S2 includes a speech section (NO in S903 and NO in S910), the process ends.

As seen above, according to the present embodiment, if the signal S1 includes a speech section, the speech of the occupant P1 is extracted; if the signal S2 includes a speech section, the speech of the occupant P2 is extracted. Thus, it can be automatically determined which of the occupants P1 and P2 is the particular speaker.

If both the signals S1 and S2 include speech sections, the speech of one of the occupants P1 and P2 is extracted in accordance with the priorities of the signals S1 and S2. Thus, when the occupants P1 and P2 utter speeches simultaneously, it is possible to prevent a failure to determine which of the occupants P1 and P2 is the particular speaker.

While, in the present embodiment, if both the signals S1 and S2 include speech sections, the signal to be noise-removed is determined in accordance with the priorities of the signals S1 and S2, the present disclosure may be configured otherwise. For example, a signal having a higher level, of the signals S1 and S2 may be determined as a signal to be noise-removed. In this case, the speech determination unit 6 may calculate the average levels of the signals in the speech sections and determine a signal having a higher average level as a signal to be noise-removed. If the speech determination unit 6 determines that the signal S1 has a higher level than the signal S2, the selectors 31 and 32, mixed speech estimation unit 2, and noise remover 3 may perform the above process performed when the signal S1 has a higher priority than the signal S2. If the speech determination unit 6 determines that the signal S2 has a higher level than the signal S1, the selectors 31 and 32, mixed speech estimation unit 2, and noise remover 3 may perform the above process performed when the signal S2 has a higher priority than the signal S1.

While the car-mounted speech collector 100 includes the two microphones, 11 and 12, in the example shown in FIG. 7, the present disclosure may be configured otherwise. As shown in FIG. 3, it may further include microphones 13 and 14.

While, in the first to fourth embodiments, the microphones and switches are disposed near the seats, they may be disposed on the seats. For example, the microphones and switches may be disposed on the headrests or the like of the seats. Also, the microphones and switches of the rear seats may be disposed on the surfaces adjacent to the rear seats, of the front seats. That is, in the present disclosure, the expression "near the seat" refers to a concept including "on the seat."

The car-mounted speech collectors of the present disclosure can, when multiple occupants utter speeches simultaneously in a car cabin, extract only the speech of a particular speaker which is desired to be collected. For this reason, the car-mounted speech collectors are useful as a technology that recognizes a speech in a car cabin.

What is claimed is:

1. An apparatus, comprising:
   a first microphone disposed near a first seat in a car cabin, the first seat configured to seat a first occupant;
   a second microphone disposed near a second seat in the car cabin, the second seat configured to seat a second occupant;
   a processor; and a memory storing a computer program, wherein
the computer program, when executed, causes the processor to execute operations including:
calculating a first envelope of a signal of the first microphone and a second envelope of a second signal of the second microphone;
detecting a first bottom level of the first envelope and a second bottom level of the second envelope;
setting a first threshold on the basis of the first bottom level and a second threshold on the basis of the second bottom level;
detecting a first speech section in which a level of the first signal is higher than the first threshold and a second speech section in which a level of the second signal is higher than the second threshold;
when one of the first and the second speech sections is detected, estimating a first or a second mixed speech using a second or a first signal acquired by the second or the first microphone, the first and the second mixed speech including a first or a second speech that has been uttered by the second or the first occupant and has entered the first or the second microphone respectively; and
removing the first or the second mixed speech from a first or the second signal acquired by the first or the second microphone.

2. The apparatus according to claim 1, further comprising:
a first switch disposed near the first seat; and
a second switch disposed near the second seat, wherein
the operations further include:
(1) when the first switch is pressed, estimating the first mixed speech using the second signal and removing the first mixed speech from the first signal; and
(2) when the second switch is pressed, estimating a second mixed speech using the first signal and removing the second mixed speech from the second signal.

3. The apparatus according to claim 1, wherein
the operations further include:
determining whether any of the first and second signals includes a speech section; and
(1) when it is determined that the first signal includes the speech section, estimating the first mixed speech using the second signal and removing the first mixed speech from the first signal; and
(2) when it is determined that the second signal includes the speech section, estimating a second mixed speech using the first signal and removing the second mixed speech from the second signal.

4. The apparatus according to claim 3, wherein
the first and second microphones are assigned priorities,
(3) when it is determined that both the first and second signals include the speech section and the priority of the first microphone which acquires the first signal is higher than the priority of the second microphone which acquires the second signal, the processor estimates the first mixed speech using the second signal and removes the first mixed speech from the first signal, and
(4) when it is determined that both the first and second signals include the speech section and the priority of the second microphone which acquires the second signal is higher than the priority of the first microphone which acquires the first signal, the processor estimates the second mixed speech using the first signal and removes the second mixed speech from the second signal.

5. The apparatus according to claim 1, wherein the first and second microphones are unidirectional microphones.

6. The apparatus according to claim 1, wherein the first and second microphones are array microphones each consisting of a plurality of microphones.

7. The apparatus according to claim 1, wherein the processor estimates the first mixed speech and the second mixed speech using an adaptive filter having a filter coefficient that is corrected so that an output signal is uncorrelated with or independent of an input signal.

8. The apparatus according to claim 1, wherein
the first microphone is disposed closer to the first seat than to the second seat in the car cabin, and
the second microphone is disposed closer to the second seat than to the first seat in the car cabin.

9. The apparatus according to claim 1, wherein, when the first speech section is detected in the first signal, the computer program causes the processor to estimate the first mixed speech using the second signal and to remove the first mixed speech from the first signal and
when the second speech section is detected in the second signal, the computer program cause the processor to estimate a second mixed speech using the first signal and to remove the second mixed speech from the second signal.

10. The apparatus according to claim 1, wherein
when the first speech section is detected in the first signal, the level of the second signal is less than the second threshold, and
when the second speech section is detected in the second signal, the level of the first signal is less than the first threshold.

11. A method, comprising:
acquiring a first signal from a first microphone disposed near a first seat in a car cabin, the first seat configured to seat a first occupant;
acquiring a second signal from a second microphone disposed near a second seat in the car cabin, the second seat configured to seat a second occupant;
calculating a first envelope of a signal of the first microphone and a second envelope of a second signal of the second microphone;
detecting a first bottom level of the first envelope and a second bottom level of the second envelope;
setting a first threshold on the basis of the first bottom level and a second threshold on the basis of the second bottom level;
detecting a first speech section in which a level of the first signal is higher than the first threshold and a second speech section in which a level of the second signal is higher than the second threshold;
when a first or a second speech section is detected, estimating a first or a second mixed speech using the second or the first signal, the first or the second mixed speech including a first or a second speech that has been uttered by the second or the first occupant and has entered the first or the second microphone respectively; and
removing the first or the second mixed speech from the first or the second signal.

12. The method according to claim 11, further comprising
estimating, when the first speech section is detected in the first signal, a first mixed speech using the second signal and removing the first mixed speech from the first signal, and estimating, when the second speech section is detected in the second signal, a second mixed speech using the first signal and removing the second mixed speech from the second signal.

13. The method according to claim 11, estimating, when a first switch positioned near a first seat is pressed, the first mixed speech using the second signal and removing the first mixed speech from the first signal; and estimating, when a second switch positioned near the second seat is pressed, the second mixed speech using the first signal and removing the second mixed speech from the second signal.

14. The method according to claim 11, further comprising assigning priorities to the first and second microphones, and when it is determined that both the first and second signals include the speech section and the priority of the first microphone, which acquires the first signal is higher than the priority of the second microphone, which acquires the second signal, estimating the first mixed speech using the second signal and removing the first mixed speech from the first signal, and when it is determined that both the first and second signals include the speech section and the priority of the second microphone, which acquires the second signal, is higher than the priority of the first microphone, which acquires the first signal, estimating the second mixed speech using the first signal and removing the second mixed speech from the second signal.

15. The method according to claim 11, wherein when the first speech section is detected in the first signal, the level of the second signal is less than the second threshold, and when the second speech section is detected in the second signal, the level of the first signal is less than the first threshold.

16. An apparatus, comprising:

a first microphone disposed near a first seat in a car cabin, the first seat configured to seat a first occupant;

a second microphone disposed near a second seat in the car cabin, the second seat configured to seat a second occupant;

a processor; and a memory storing a computer program, wherein the computer program, when executed, causes the processor to execute operations including:

acquiring a first signal using the first microphone;
acquiring a second signal using the second microphone;
calculating envelopes of the first and second signals;
detecting bottom levels of the envelopes;
setting a threshold on the basis of the bottom levels; and
determining a section in which levels of the first and second signals are higher than the threshold, as the speech section;
determining whether any of the first and second signals includes the speech section; and (1) when it is determined that the first signal includes the speech section, estimating a first mixed speech using the second signal, the first mixed speech including a first speech that has been uttered by the second occupant and has entered the first microphone, and removing the first mixed speech from the first signal; and (2) when it is determined that the second signal includes the speech section, estimating a second mixed speech using the first signal, the second mixed speech including a second speech that has been uttered by the first occupant and has entered the second microphone, and removing the second mixed speech from the second signal.

17. The apparatus according to claim 16, wherein the first and second microphones are assigned priorities,
when it is determined that both the first and second signals include the speech section and the priority of the first microphone which acquires the first signal is higher than the priority of the second microphone which acquires the second signal, the processor estimates the first mixed speech using the second signal and removes the first mixed speech from the first signal, and when it is determined that both the first and second signals include the speech section and the priority of the second microphone which acquires the second signal is higher than the priority of the first microphone which acquires the first signal, the processor estimates the second mixed speech using the first signal and removes the second mixed speech from the second signal.

18. The apparatus according to claim 16, wherein, when the first speech section is detected in the first signal, the computer program causes the processor to estimate a first mixed speech using the second signal and removes the first mixed speech from the first signal, and when the second speech section is detected in the second signal, the computer program causes the processor to estimate a second mixed speech using the first signal and removes the second mixed speech from the second signal.

19. The apparatus according to claim 16, further comprising:

a first switch positioned near the first seat; and
a second switch positioned near the second seat, wherein the operations further include:

when the first switch is pressed, estimating the first mixed speech using the second signal and removing the first mixed speech from the first signal; and when the second switch is pressed, estimating the second mixed speech using the first signal and removing the second mixed speech from the second signal.

20. The apparatus according to claim 16, wherein when the first speech section is detected in the first signal, the level of the second signal is less than the second threshold, and when the second speech section is detected in the second signal, the level of the first signal is less than the first threshold.

* * * * *